United States Patent
Hsu et al.

(10) Patent No.: US 8,406,904 B2
(45) Date of Patent: Mar. 26, 2013

(54) TWO-DIMENSIONAL MULTI-PRODUCTS MULTI-TOOLS ADVANCED PROCESS CONTROL

(75) Inventors: Chih-Wei Hsu, Chuang-Hua (TW); Yen-Di Tsen, Chung-Ho (TW); Jong-I Mou, Hsinpu Township, Hsinchu County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 245 days.

(21) Appl. No.: 13/033,413

(22) Filed: Feb. 23, 2011

(65) Prior Publication Data

US 2012/0215337 A1     Aug. 23, 2012

(51) Int. Cl.
G05B 13/02 (2006.01)
G06F 19/00 (2011.01)
(52) U.S. Cl. .............................. 700/30; 700/31; 700/121
(58) Field of Classification Search .............. 700/28–31, 700/121
See application file for complete search history.

(56) References Cited

U.S. PATENT DOCUMENTS 7,869,894 B2 * 1/2011 Stirton et al. ................. 700/109
2010/0249976 A1 * 9/2010 Aharoni et al. ............... 700/110

* cited by examiner

*Primary Examiner* — Ryan Jarrett
(74) *Attorney, Agent, or Firm* — Haynes and Boone, LLP (57) ABSTRACT

The present disclosure provides a method. The method includes gathering advanced process control (APC) data from a subset of available wafers and a subset of available processing chambers. The method includes establishing a matrix that contains a plurality of cells. The cells each correspond to one of the available wafers and one of the available processing chambers. The matrix is partially filled by populating cells for which the APC data has been gathered. The method includes determining a plurality of chamber-coverage-rate (CCR) parameters associated with the matrix. The method includes optimizing the CCR parameters through an iteration process to obtain optimized CCR parameters. The method includes predicting an APC data value for a designated cell of the matrix based on the optimized CCR parameters. The designated cell is an empty cell before the predicting and is populated by the predicting.

20 Claims, 6 Drawing Sheets

| LOT | CCR_self_min | CCR_by_part_min | | CCR_avg_min | OFFSET |
|---|---|---|---|---|---|
| N2K555.J0 | 0.05 | 0.1 | [BESTL3#3][TMAQ30] 0.4021 | 0.3745 | -2.2 |
|  | 0.05 | 0.15 | 0.7576 | 0.5556 | -1.8445 |
|  | 0.05 | 0.3 | 1.1086 | 0.7556 | -1.4935 |
| N2K736.00 | 0.05 | 0.3 | [BESTL3#2][TMAE76] 2.8286 | 0.6465 | 0.2 |
|  | 0.05 | 0.15 | 2.7675 | 0.4967 | 0.1389 |
|  | 0.05 | 0.1 | 2.6563 | 0.3452 | 0.0277 |
| N2G501.00 | 0.05 | 0.3 | [BESTL3#3][TMZ428] 2.518 | 0.7654 | -0.2 |
|  | 0.05 | 0.15 | 2.1448 | 0.5481 | -0.5732 |
|  | 0.05 | 0.1 | 1.7492 | 0.3632 | -0.9688 |
| N2G584.00 | 0.05 | 0.3 | [BESTL3#2][TMZ427] 2.0209 | 0.7531 | -0.8 |
|  | 0.05 | 0.15 | 2.0389 | 0.5407 | -0.782 |
|  | 0.05 | 0.1 | 1.9718 | 0.359 | -0.8491 |
| N2H286.00 | 0.05 | 0.3 | [BESTL3#3][TMAT63] 0.9452 | 0.75 | -1.1 |
|  | 0.05 | 0.15 | 0.8617 | 0.5417 | -1.1835 |
|  | 0.05 | 0.1 | 1.0996 | 0.381 | -0.9456 |

Fig. 7

TWO-DIMENSIONAL MULTI-PRODUCTS MULTI-TOOLS ADVANCED PROCESS CONTROL

BACKGROUND

Semiconductor integrated circuits are produced by a plurality of processes in a wafer fabrication facility (fab). As examples, these processes may include thermal oxidation, diffusion, ion implantation, rapid thermal processing (RTP), chemical vapor deposition (CVD), physical vapor deposition (PVD), epitaxy, etch, and photolithography. As performance requirements and throughput demands increase, semiconductor fabrication process control has become increasingly crucial. However, as process geometries decrease, it may be challenging to keep process variations at acceptable levels. As such, the processes may suffer from losses in tool productivity, increased operator interaction, yield loss, and higher rework rates, all possibly leading to higher costs.

Advanced Process Control (APC), which may include models and feedback systems among other process control techniques, has been widely used to help alleviate some of the variations. It is also desirable to utilize APC techniques to establish models and use these models to predict process performance. However, existing APC techniques may suffer from shortcomings such as heavy dependence on human input and manual calculations, inaccurate predictions, and the need for multiple model revisions. These shortcomings tend to cause delay in the manufacturing process and therefore increases fabrication costs.

Consequently, although existing APC techniques have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
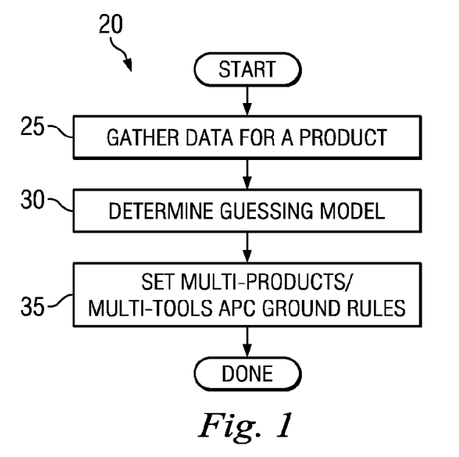
FIG. 1 illustrates a flowchart of an advanced process control (APC) method according to various aspects of the present disclosure.

FIG. 1 is a flowchart of an APC method 20 for improving semiconductor manufacturing performance according to an embodiment of the present disclosure. It is understood that the APC method 20 may include additional steps that can be performed before, during, or after the blocks shown in FIG. 1.

The method 20 includes block 25 in which data is gathered. The data may come from any semiconductor device product, for example an Integrated Circuit (IC) chip. The data gathered is with respect to a specific process or recipe, for example an etching process, an oxidation process, a diffusion process, a deposition process, a lithography process, or another applicable process. As long as the process or recipe is the same, the data may come from different products or wafers. The gathered data may also come from different processing chambers. The gathered data may be limited. For example, the gathered data may only contain data from three out of ten available processing chambers. Hence, the gathered data may also be referred to as limited existing data/experience.

The method 20 continues with block 30 in which a guessing model is determined. The guessing model is a mathematical model that is used to predict future process performance based on existing data. For example, the guessing model can be used to establish the initial settings of a chamber that has not been used to process the product in a manner such that the expected process performance of the product in that chamber will be within desired control limits. The guessing model may be an "analysis of covariance (ANCOVA)" model, or an "expectation maximization" model, or another suitable model. In one simple example, the guessing model may be $y=a*x+b$, where y represents the process performance, x represents the process settings (tool settings), and a and b have adjustable values. It is understood that the guessing model may include other complex mathematical equations, such as second or third order equations with a plurality of variables. Here, the block 30 takes the existing gathered data from block 25 as inputs and generates the guessing model as an output.

The method 20 continues with block 35 in which a set of Multi-products/Multi-tools APC ground rules are set. These APC ground rules help set up the guessing model in block 30 such that the guessing results will be 100% within the desired control limits with only one try. In other words, once the guess model is established and initialized, it does not need to be revised or tweaked any further. Within a single attempt, the corresponding process associated with the guessing model will be 100% within the control limits. These ground rules may involve calculations and automations, which can all be carried out by a computer system and is therefore fast.

Prior APC methods often times require human engineers to manually calculate and initialize the guessing model. Since it involves calculations by humans, it is a time-consuming process and causes delay to semiconductor fabrication. Also, human engineers are prone to make mistakes in calculation, and consequently the guessing model would frequently suffer from poor performance such as inaccurate prediction results. When that happens, the engineer may need to revise the model. During that time, fabrication is suspended, which increases manufacturing inefficiency and wastes fabrication resources. Furthermore, these calculations are dependent on the experience and skills of the particular engineer who is performing the calculations. Therefore, the guessing models were not derived by an empirical and/or systematic approach. The quality of the guessing model could vary dramatically depending on the specific engineer. In comparison, the APC method 20 is empirical and systematic, and is not dependent on the skills of the engineer but is carried out by an automated machine/system. As a result, what would have taken multiple hours previously can now be done in a matter of seconds, and with improved accuracy.

Figure 2:
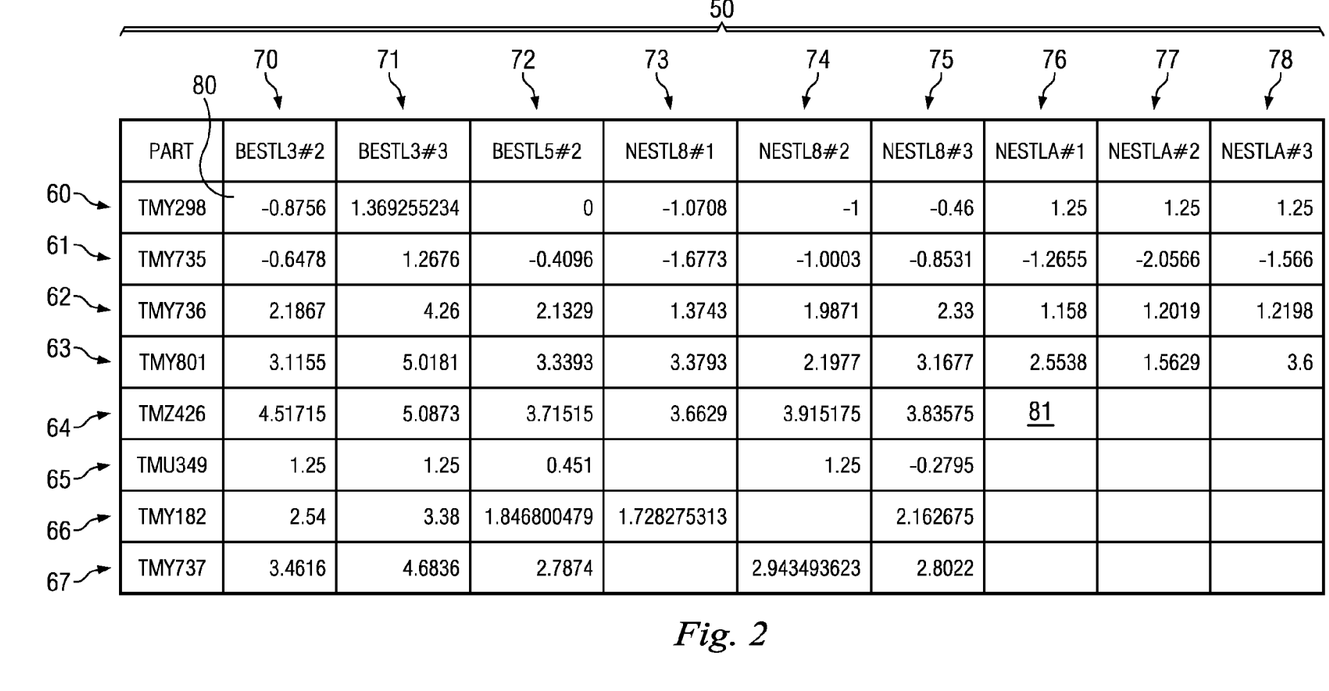
FIG. 2 illustrates a matrix according to various aspects of the present disclosure.

FIG. 2 is a matrix 50 that helps illustrate some of the APC ground rules according to the various aspects of the present disclosure. The matrix 50 includes rows 60-67 and columns 70-78. The rows 60-67 represent guessing model data with respect to a specific recipe/process across different products, respectively. The columns 70-78 represent guessing model data collected with respect to a specific recipe/process across different processing chambers, respectively. Thus, an intersection—referred to as a cell—between one of the rows 60-67 and one of the columns 70-78 represents guessing model data collected with respect to the specific recipe/process for a particular product at a given processing chamber. As an example, the matrix 50 may involve a gate etching process, which can be modeled by $y=a*x+b$, where y is etching depth, and x is etching tool settings, a is an adjustable coefficient, and b is an adjustable constant (also referred to as an offset). A cell 80 formed by the intersection of row 60 and column 70 represents the value of "b" in the above equation for product TMY298 at the processing chamber BESTL3#2. It is understood that for other matrices, the cells may represent other APC-related variables, coefficients, and/or offsets.

It can be seen that the matrix 50 includes populated cells containing data as well as empty cells containing no data. These empty cells indicate that the recipe/process has not been run for the associated product at the corresponding chamber yet, therefore no data is available for that cell. For example, a cell 81 formed by the intersection of row 64 and column 76 contains no data. This means that no gate etching process has been performed for the product TMZA26 at the processing chamber NESTLA#1.

The data shown in the matrix 50 must also have been gathered from within a predefined recent period, for example within the past 30 days. If the data associated with a particular chamber and product is older than this predefined recent period, then the matrix 50 displays the cell as containing no data—because data that is too old is considered unreliable for purposes of making accurate predictions and is therefore discarded by the matrix.

Therefore, for every product, a "chamber-coverage-rate" (CCR) can be determined. The CCR for any product refers to how many chambers have run the product recently (e.g., within the past 30 days, or another predefined period) out of how many available chambers there are. As examples, referring to row 60, the CCR for the TMY298 product is 9 out of 9 (or 100%), since all 9 cells in row 60 contain data. Referring to row 64 as another example, the CCR for the TMZA26 product is 6 out of 9 (or 66.7%), since only 6 out of 9 cells in row 64 contain data. As an additional example, referring to row 67, the CCR for the TMY737 product is 5 out of 9 (or 55.6%), since only 5 out of 9 cells in row 67 contain data.

One of the goals of the APC technique of the present disclosure is to "expand" the rows horizontally (and/or the columns vertically) to populate the empty cells with prediction results. In other words, using existing guessing model data available (the already populated cells of the matrix 50), the APC technique herein will determine the values of the empty cells of the matrix. By doing so, the APC technique can quickly initialize the guessing model for any given product and given process chamber, even if no wafer has been run in that chamber yet. As discussed above, this will shorten processing time and reduce fabrication costs.

The APC technique herein involves several ground rules. The first ground rule is to ascertain which parts or products can constitute a valid reference part that can be used to calculate the values of the empty cells of the matrix. For a specific part or product to be qualified into the matrix 50 (and thus constitute a reference part), it must pass a minimum CCR threshold, referred to as CCR_by_part_min. Using the matrix 50 as an example, if CCR_by_part_min is set to be 100%, then only rows 60-63 can qualify into the matrix 50 to be used as viable reference data. On the other hand, if the CCR_by_part_min is set to be 60%, then row 64 also qualifies into the matrix 50, since row 65 has a CCR of 66.7%. But rows 65-67 still cannot qualify into the matrix 50. If the CCR_by_part_min is set to be 50%, then all the rows 60-67 can qualify into the matrix 50 and be used as reference data.

It can be seen that setting the value for the minimum CCR threshold CCR_by_part_min entails a tradeoff between data availability and prediction accuracy. If CCR_by_part_min is set to be a high value, then only a few of the data sets (rows) can qualify into the matrix to become reference data. These data sets represent the best data available, which would facilitate better prediction by a guessing model. However, since a high CCR_by_part_min threshold makes it tough for a data set to qualify into the matrix 50, there may not be sufficient amount of data to establish a valid guessing model. On the other hand, if CCR_by_part_min is set to be a low value, then much more data can get into the matrix 50, meaning that having a sufficient amount of data is no longer a problem. But since the requirements for getting into the matrix 50 are lowered, bad or inaccurate data may also get into the matrix. This may lead to an inaccurate guessing model having poorer prediction accuracy. As such, CCR_by_part_min needs to be optimally set, which can be neither too high nor too low.

The second ground rule is self-chamber-coverage-rate (CCR_self_min) and is defined as: (the number of non-out-of-date chambers/cells for a particular product) divided by (the number of totally available chambers for that product). This means that in order to make a valid prediction for a product, the product itself must have already gone through processing at a sufficient number of chambers. Using the matrix 50 as an example, if CCR_self_min is set to be 60%, then only the rows 60-64 pass the CCR_self_min threshold and can therefore have the APC technique applied to fill in their remaining empty cells; whereas rows 65-67 fail the CCR_self_min and are thus considered to not have been processed by enough chambers for the APC technique to be applied. If CCR_self_min is set to be 50%, then all the rows 60-67 pass the CCR_self_min threshold, and can all have the APC technique applied to populate their respective remaining empty cells. Stated differently, setting the value of CCR_self_min determines what products are viable candidates for which the APC predictions can be made.

The two ground rules discussed above (CCR_by_part_min and CCR_self_min) can also be referred to as rules pertaining to an inside loop. The last ground rule is the average-chamber-coverage-rate (CCR_avg) of a matrix, which can also be referred to as a rule pertaining to a gating loop, or a two-dimensional CCR rule. CCR_avg is defined as: (the number of non-out-of-date chambers/cells for all products) divided by (all available chambers/cells for a downsized matrix). To elaborate, the matrix 50 may be a downsized matrix already. The original matrix may have more rows and/or columns. For example, the original matrix may have contained another row in addition to rows 60-67. However, that extra row may not have met the CCR_by_part_min ground rule to qualify into the matrix (e.g., the extra contains no data or only data for 1 or 2 chambers). Therefore, that extra row is discarded, and thus the original matrix is downsized or transformed into the new matrix, which is the matrix 50 as illustrated in FIG. 2. Similarly, the matrix 50 can still be downsized by removing rows based on the values of CCR_self_min and CCR_by_part_min.

To calculate CCR_avg using the matrix 50 as an example, the number of non-out-of-date chambers/cells is 57, which is obtained by summing all the cells that contain data. The number of available chambers/cells for the (downsized) matrix is 72, which is obtained by summing all the cells of the matrix (8 rows×9 chambers=72). Thus, the CCR_avg of the matrix 50 is 57/72=79.2%. CCR_avg represents a confidence index. A minimum threshold value of an acceptable CCR_avg—designated as CCR_avg_min—will also be calculated by the APC technique of the present disclosure.

Figure 3:
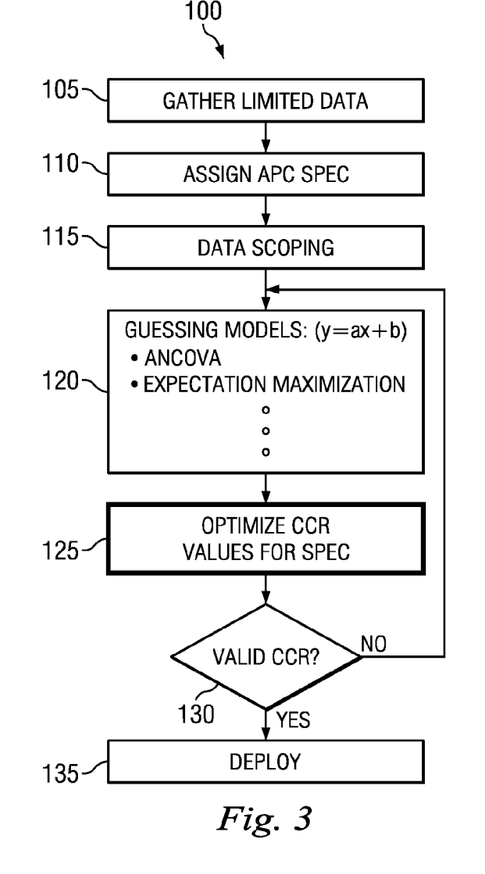
FIG. 3 illustrates a flowchart of an APC method according to various aspects of the present disclosure.

FIG. 3 is a flowchart of an APC method 100 that illustrates how the minimum thresholds of all three of the ground rules CCR_by_part_min, CCR_self_min, and CCR_avg_min are automatically determined. The method 100 includes block 105 in which limited data is gathered. The limited data may come from chambers in which the product has been processed recently, or from chambers in which other products have been processed.

The method 100 continues with block 110 in which APC specification limits are set. For example, for a poly etching process, the APC specification limits may be set to +/−1.5 nanometers (nm). It is understood that the APC specification limits disclosed herein are mere examples and may be set differently, and that different processes may each have its own APC specification limits.

The method 100 continues with block 115 in which data scoping is performed. The block 115 determines which data can be used to establish a "matrix." It may decide that in order to be in a matrix, all the data need to be associated with the same recipe. The data may come from the same chamber (but different products) or the same product (but different chambers).

The method 100 continues with block 120 in which a guessing model is established. A simple guessing model may have the form y=a*x+b, though it is understood that the guessing model may include a plurality of other mathematical models, including the ANCOVA model and the expectation maximization model discussed above, and/or other second order or third order equations. In other words, the guessing model can also include any other suitable mathematical model. The guessing model is initialized based on the results of the data scoping block 115. A guessing model can be individually established for each of the empty cells of the matrix 50 shown in FIG. 2.

The method continues with block 125 in which the values of CCR_by_part_min, CCR_self_min, and CCR_avg_min are optimized. These optimized CCR values will ensure that the guessing models of the block 120 will return values that meet the APC specification limit assigned in block 110. The optimization of the CCR values involves the following optimization statement:

Define:

φ is the wafer distribution of part or product by chamber
$\hat{y}(x|x \in \phi)$ is the guessing function of the guessing model
$\lambda(x, CCR\_self\_min, CCR\_by\_part\_min|x \in \phi)$ is function of wafer amount $$CCR\_avg\_min = \frac{\lambda(x \mid x \in \varphi)}{\lambda(x \mid x \in I)} \propto \frac{1}{|y(x) - \hat{y}(x)|}$$

Solve:

max $\lambda(x, CCR\_self\_min, CCR\_by\_part\_min|x \in \phi)$
st. $|y(x)-\hat{y}(x)|x \in \phi| <$spec, CCR_self_min, CCR_by_part_min, CCR_avg_min After the CCR values are optimized, the method 100 proceeds to a decision block 130 to evaluate whether or not the optimized CCR values are valid. In other words, the decision block 130 checks whether or not the optimized CCR values would enable the product to stay within the APC specification limit set by the block 110. If not, then the CCR values are not valid and needs to be optimized again, this time using a different guessing model. This process repeats until the optimized CCR values are confirmed to be valid. When that occurs, the method 100 proceeds to the block 135, which is the deployment phase. In the deployment phase, the APC results returned by the guessing model are used to perform one or more semiconductor fabrication processes to wafers in chambers that previously had no APC data (the empty cells of the matrix 50). In comparison to the deployment phase, blocks 105-130 of the method 100 are considered to be in a developing phase, where no actual wafer processing is going on, and all the calculations associated with the various blocks are carried out by computers and/or other automated systems.

Figure 4A:
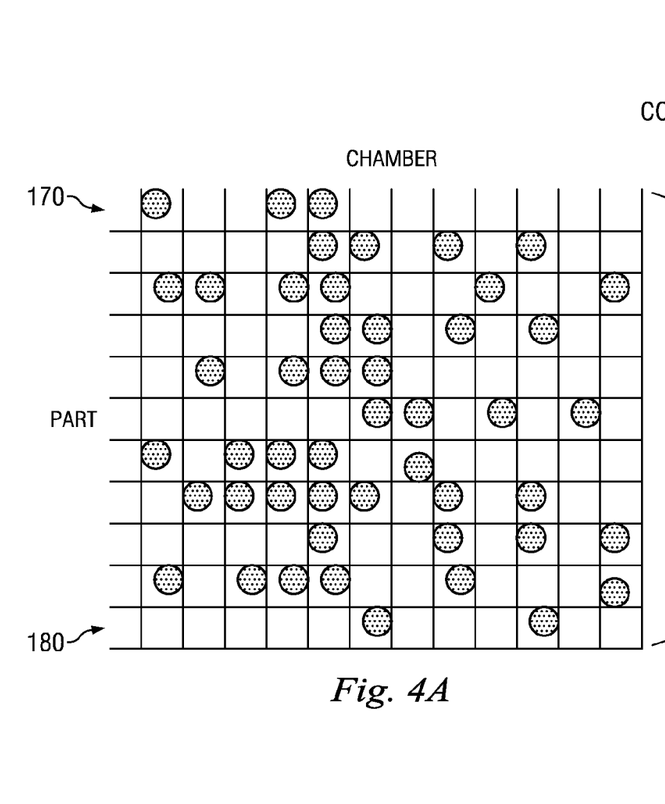
FIGS. 4A and 4B illustrate a grid and a resized grid of wafer-chamber combinations according to various aspects of the present disclosure.
Figure 4B:
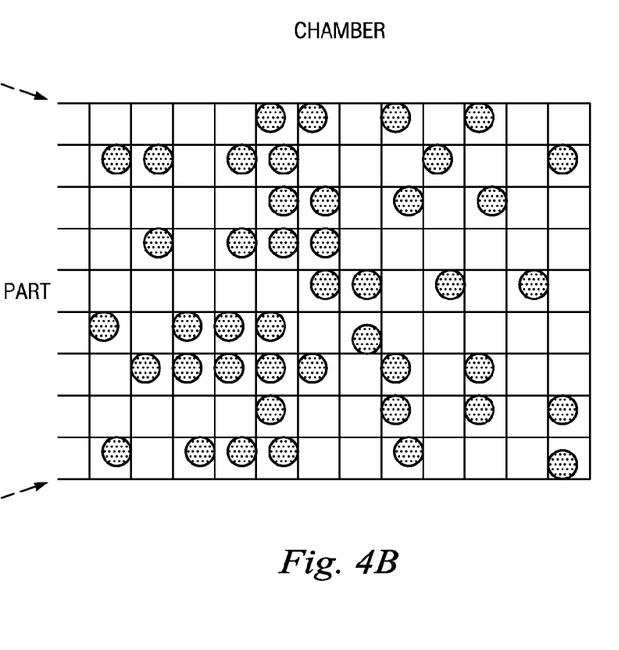

The CCR values optimization process is further illustrated in some of the following figures. FIGS. 4A and 4B are each a graphical representation of a matrix similar to the matrix 50 of FIG. 2. FIGS. 4A and 4B each contain a plurality of rows and columns, whose intersections form grids (similar to the cells of the matrix 50). Some of the grids contain a dot, while other grids are empty. The dot-containing grids are similar to the data-containing cells of the matrix 50, which means that APC data is available for the combination of that particular product and that particular chamber. The grids that contain no dots are similar to the empty cells of the matrix 50, which means that no APC data is available for the combination of that particular product and that particular chamber. These empty grids need to be filled by guessing the data for them with the APC technique of the present disclosure.

Referring to FIG. 4A, it contains 11 rows (11 products) and 12 columns (chambers). Thus, the total number of available grids is 11×12=132. The total number of dots in FIG. 4A is 49. Hence, the CCR_avg of FIG. 4A=49/132=37.1%. Suppose the CCR_self_min is set to be 4/12 (or 33.3%), then FIG. 4A is transformed into FIG. 4B by downsizing the matrix of FIG. 4A. In particular, the top row 170 and the bottom row 180 of FIG. 4A each contain less than 4 data-containing grids out of 12 total grids, so they are eliminated. The resized matrix of FIG. 4B now contains 9 rows and still 12 columns, and thus its total number of available grids is now 9×12=108. The total number of dots in FIG. 4B is reduced to 44. Hence, the CCR_avg of FIG. 4B=44/108=40.7%. Recall that CCR_avg represents a confidence index. The transformation from FIG. 4A to FIG. 4B indicates that the confidence index can be improved by changing the CCR criteria such as raising the threshold for CCR_self_min (or CCR_by_part_min).

Using FIGS. 4A-4B to illustrate the optimization statement discussed above, cp in the optimization statement represents the distribution status of the dots in the grid of FIG. 4A, and λ represents the number of dots in the grid. $\lambda(x|x \in \phi)$ represents the number of dot-containing grids, and $\lambda(x|x \in I)$ represents the total number of grids. Note that the number of dots does not necessarily correspond to the number of wafers processed. For example, multiple wafers may be processed at a specific chamber, but only the data of the most recent wafer is used, which is represented by the dot. Hence, a plurality of wafers processed at a chamber may yield only a single data point—the most recent one.

Figure 5:
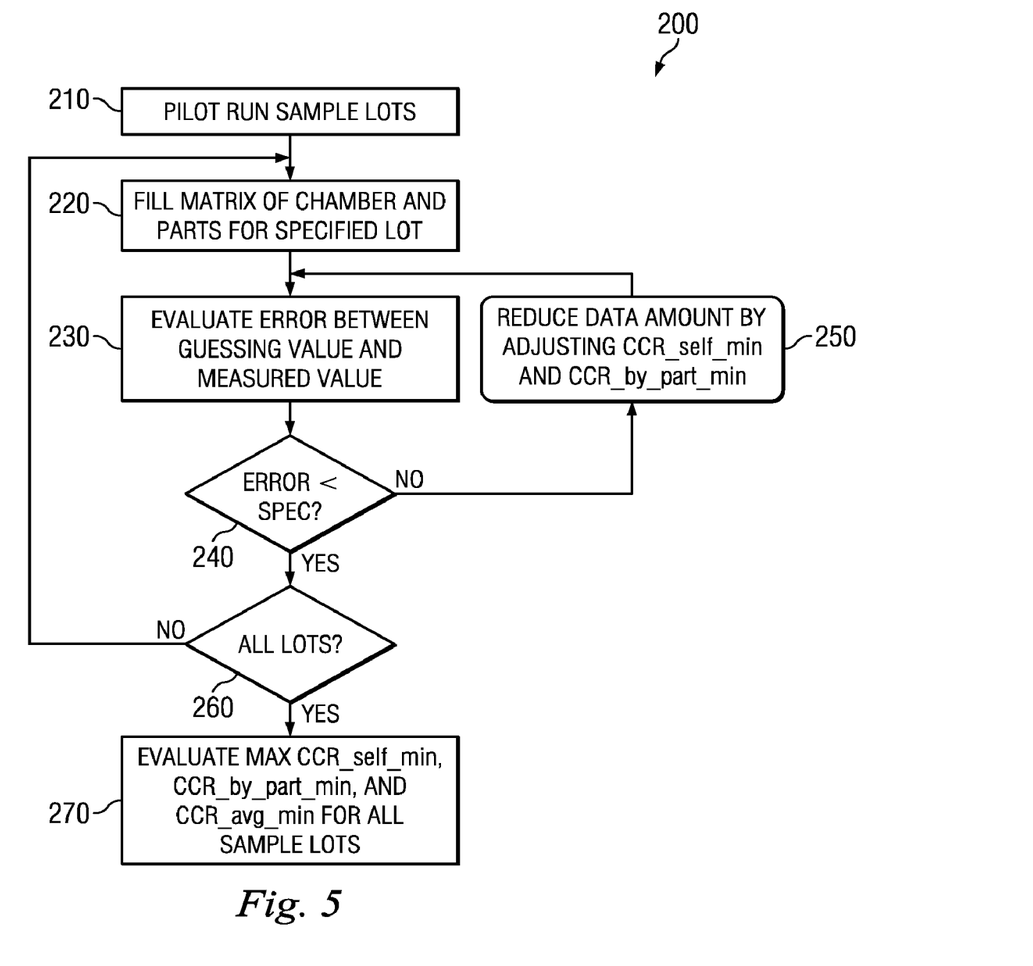
FIG. 5 illustrates a flowchart of a method of optimizing a plurality of ground rules according to various aspects of the present disclosure.

FIG. 5 is a flowchart of an optimization method 200 utilizing a top-to-down approach to optimize the various CCR values. The method 200 includes block 210 in which a pilot run of sample lots is conducted. APC data can be collected based on these sample lots. Hence, a matrix similar to the matrix 50 of FIG. 2 can be formed. The method 200 continues with block 220 in which a designated empty cell of the matrix is filled. In other words, a guessing model is established to guess the value of that designated empty cell. The method 200 then continues to block 230 in which the guessing value (also referred to as guessed value, or predicted value) is compared with the measured value for that empty cell. The measured value can be obtained from simulation results, or from actual wafer measurements in the chamber.

The difference between the guessing value and the measured value is referred to as an error. Referring to the optimization statement above, the error is mathematically expressed as $|y(x)-\hat{y}*x|$, where $y(x)$ is the measure value, and $\hat{y}(x)$ is the predicted or guessed value. From the optimization statement, it can be seen that CCR_avg_min is inversely proportional to the error. This means that as CCR_avg_min is optimized (increased), the error is reduced, and therefore the confidence index of the prediction is increased.

The method 200 then proceeds to a decision block 240, in which an evaluation is made to determine whether the error returned by block 230 is within specification limits. If it is not, then the method 200 proceeds to block 250, where the available data amount is reduced by raising CCR_self_min and CCR_by_part_min, similar to what was discussed above in association with FIG. 4. Stated differently, by increasing the values of CCR_self_min and/or CCR_by_part_min, it makes it more difficult for potentially unreliable data to get into the matrix. Hence, the matrix is downsized, and a prediction based on the downsized matrix will have a higher confidence index associated therein. The prediction may be made by adjusting the guessing model, for example giving it different input values or using a different guessing model. As a result of the matrix being downsized and the guessing model possibly being changed, the error returned by block 230 (when block 230 is executed again after block 250) is likely reduced.

The above process may repeat a few times until the error returned by block 230 is finally within specification limits. The method 200 then proceeds to another decision block 260 to determine whether this process has been performed for all lots. If the answer is no, then the method 200 goes back to block 220 again. If the answer is yes, then the method 200 proceeds to block 270 to evaluate the maximum or the optimized CCR_self_min, CCR_by_part_min, and CCR_avg_min for all the sample lots.

With the optimized CCR values, an accurate APC model can be established for all the empty cells in a matrix, and actual semiconductor processing for the products/chambers corresponding to each cell can begin with the valid and accurate APC model. For example, once the empty cell 81 of the matrix 50 of FIG. 2 is filled by performing the method 200 of FIG. 5, a poly etching process APC model is establish for the product TMZA26 at the processing chamber 76, with only one try. Actual poly etching processes can be performed for the product TMZA26 at the processing chamber 76, with the confidence that the APC specification limits will be met. The engineers need not manually calculate and/or re-calculate APC parameters.

The method 200 is referred to as a "top-to-down" approach because the original raw matrix is the biggest—containing the most number of cells. As the method 200 is executed, the size of the matrix shrinks, and the value of CCR_avg_min increases from a relatively small value. The CCR_avg_min that is finally settled on is deemed as the optimized CCR_avg_min.

Figure 6:
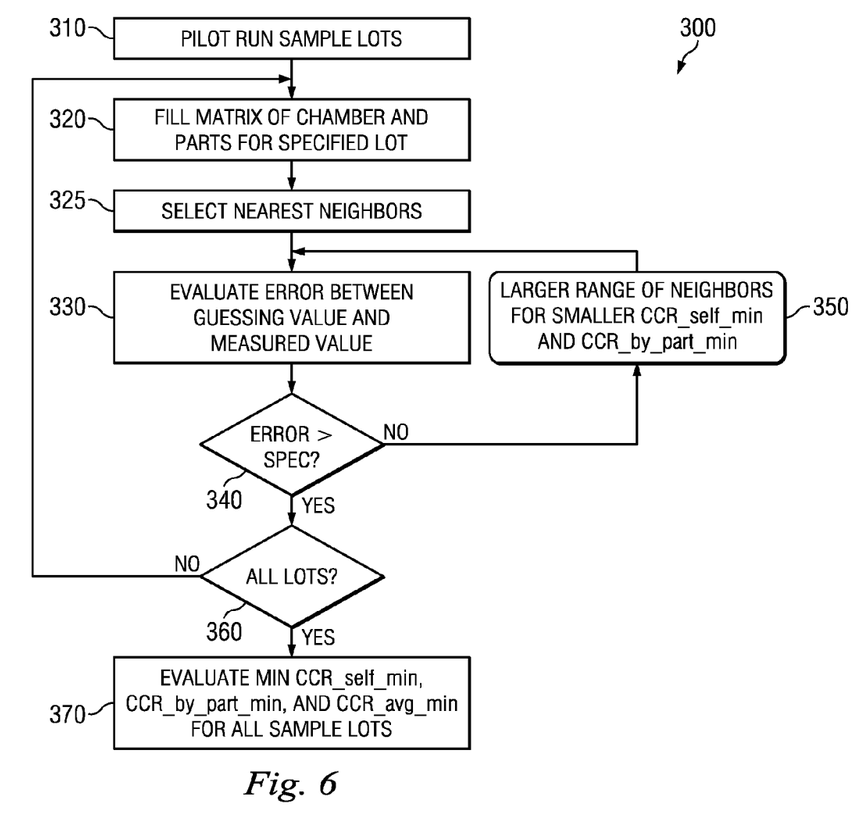
FIG. 6 illustrates a flowchart of another method of optimizing a plurality of ground rules according to various aspects of the present disclosure.

In comparison, FIG. 6 is a flowchart of an alternative optimization method 300 for optimizing the CCR values. The optimization method 300 utilizes a bottom-up approach that is somewhat opposite of the "top-to-down" approach illustrated in the method 200 of FIG. 5. Whereas the top-to-down approach starts with a relatively small CCR_avg_min value and increases it by shrinking the matrix, the bottom-up approach starts with a relatively large CCR_avg_min value and decreases it by expanding the matrix. In more detail, the method 300 includes blocks 310 and 320 that are similar to the blocks 210 and 220 of FIG. 5. The method 300 then proceeds to block 325 to select the nearest neighbor of the cell that needs to be filled. The nearest neighbor of the cell that needs to be filled should have similar properties to that cell, either because they share the same chamber or belong to the same product. At this point, CCR_avg_min has a relatively high value, for example close or equal to 100%.

Based on this relatively CCR_avg_min value—which is fairly restrictive because it limits the amount of data that can get into the matrix—the method 300 proceeds to block 330 to evaluate the error between the guessing value and the measured value. Once again, the "measured" value may come from either simulation results or from actual wafer processing results. Thereafter, a decision block 340 determines whether the error is greater or smaller than the specification limits. Since CCR_avg_min started with a high value, at this point the error is almost certain to be within the specification limits, in which case the method 300 would proceed to block 350 to expand the range of neighboring cells by decreasing the values of CCR_self_min and CCR_by_part_min. Stated differently, block 350 makes it easier for data to qualify into the matrix.

In this fashion, the process above is repeated until the error is finally outside the specification limits. At that point, the CCR values determined on the previous repetition would be deemed as optimized values. The method 300 then executes blocks 360 and 370, similar to how the method 200 executes blocks 260 and 270 in FIG. 5.

Figure 7:
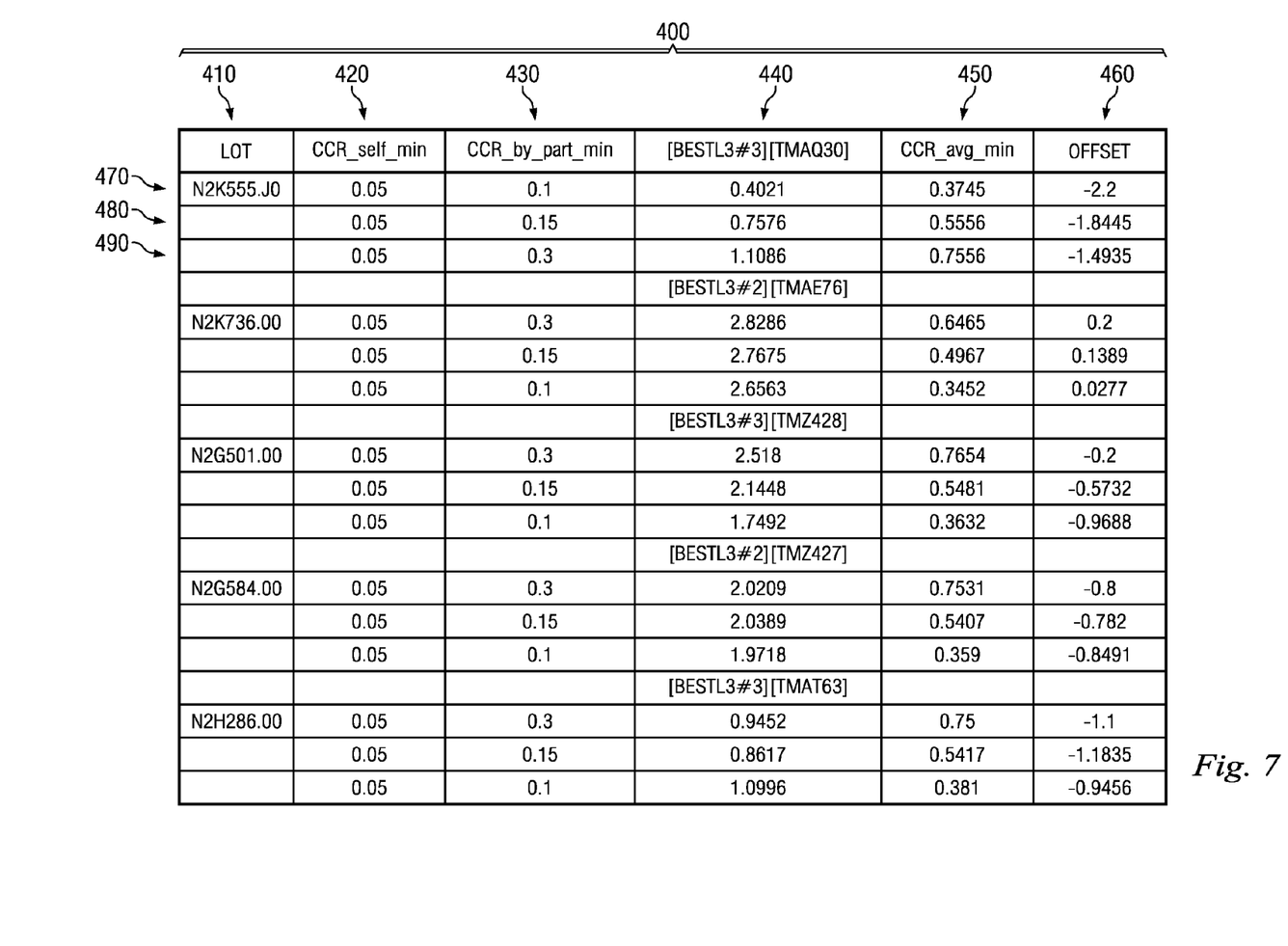
FIG. 7 illustrates a table showing optimization iterations according to various aspects of the present disclosure.

FIG. 7 is a table 400 that shows optimization iterations using a top-to-down approach (illustrated in FIG. 5) for some example wafer lots. The table 400 includes columns 410-460. Column 410 includes different example wafer lots, such as N2K555.J0, N2K736.00, N2G501.00, etc. Column 420 includes the CCR_self_min values associated with each wafer lot at different stages of optimization. Column 430 includes the CCR_by_part_min values associated with each wafer lot at different stages of optimization. Column 440 includes the values that are supposed to fill in the empty cells (e.g., value of "b" of $y=a*x+b$). Column 450 includes the CCR_avg_min values at different stages of optimization. Column 460 includes values of the offset error, whose magnitude or absolute value is desired to be less than the predefined specification limits (e.g. <=1.5).

The CCR optimization process is discussed using rows 470-490 as an example. Starting with row 470, the CCR_self_min value is set to be 0.05 for the lot N2K555.J0, and the CCR_by_part_min value is set to be 0.1. At this stage, the error offset is −2.2, which means its magnitude (2.2) is greater than the specification limit of 1.5. Therefore, the CCR values are not optimized yet. Thereafter, in row 480, the CCR_self_ min value is maintained the same, but the CCR_by_part_min value is increased to 0.15. At this time, the error offset value is reduced to −1.8445, which is closer to the specification limit than before, but still not meeting it. At the next iteration in row 490, CCR_self_min still stays the same, but CCR_by_part_min is increased to 0.3. At this point, the error offset value is −1.4935, which means its magnitude is finally within the specification limit of 1.5. Thus, the optimization process results in an optimized CCR_self_min value of 0.05, an optimized CCR_by_part_min value of 0.3, and an optimized CCR_avg_min value of 0.5556. It is understood that a theoretical value of 0.15 may also work for the optimized CCR_by_part_min, and that the value of 0.3 for CCR_by_part_min may represent a more practical value with some "buffers" built in.

For the following wafer lots, such as wafer lot N2K736.00, N2G501.00, etc, the optimized CCR_by_part_min value of 0.3 is used as well. It can be observed that the optimized CCR_by_part_min value of 0.3 will yield error offset values that are within the specification limit of 1.5 for these other lots too. The rows that show CCR_by_part_min having values other than 0.3 are just shown for providing extra examples. These other values do not represent the optimized CCR_by_part_min value.

These CCR optimization calculations relate to the developing phase (discussed in association with FIG. 3). Afterwards, in the deployment phase (when the wafers are actually processed), the optimized CCR values are no longer being re-calculated. The optimized CCR_self_min and CCR_by_part_min values are still used to resize the matrix. In a sense, they serve to filter the data that can come into the matrix. Meanwhile, the optimized CCR_avg_min value is used to determine if the prediction can be trusted. For example, if the CCR_avg_min is not met in the deployment phase, then that indicates the confidence level is not sufficiently high for the predicted APC model, and therefore the predicted model will not be used.

Figure 8:
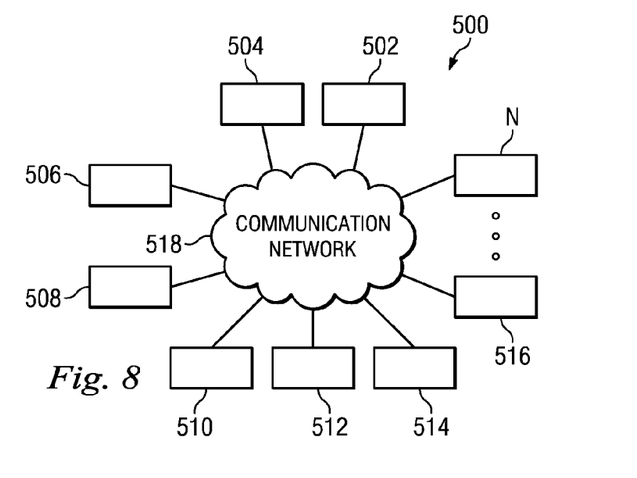
FIG. 8 illustrates an integrated circuit fabrication system according to various aspects of the present disclosure.

FIG. 8 illustrates an integrated circuit fabrication system 500. The fabrication system 500 includes a plurality of entities 502, 504, 506, 508, 510, 512, 514, 516 . . . , N that are connected by a communications network 518. The network 518 may be a single network or may be a variety of different networks, such as an intranet and the Internet, and may include both wire line and wireless communication channels.

In an embodiment, the entity 502 represents a service system for manufacturing collaboration, the entity 504 represents an user, such as product engineer monitoring the interested products, the entity 506 represents an engineer, such as a processing engineer to control process and the relevant recipes, or an equipment engineer to monitor or tune the conditions and setting of the processing tools, the entity 508 represents a metrology tool for IC testing and measurement, the entity 510 represents a semiconductor processing tool, the entity 512 represents a virtual metrology module associated with the processing tool 510, the entity 514 represents an advanced processing control module associated with the processing tool 510 and additionally other processing tools, and the entity 516 represents a sampling module associated with the processing tool 510.

Each entity may interact with other entities and may provide integrated circuit fabrication, processing control, and/or calculating capability to and/or receive such capabilities from the other entities. Each entity may also include one or more computer systems for performing calculations and carrying out automations. For example, the advanced processing control module of the entity 514 may include a plurality of computer hardware having software instructions encoded therein. The computer hardware may include hard drives, flash drives, CD-ROMs, RAM memory, display devices (e.g., monitors), input/output device (e.g., mouse and keyboard). The software instructions may be written in any suitable programming language and may be designed to carry out specific tasks, such as the tasks associated with optimizing the CCR values as discussed above.

The integrated circuit fabrication system 500 enables interaction among the entities for the purpose of integrated circuit (IC) manufacturing, as well as the advanced processing control of the IC manufacturing. In an embodiment, the advanced processing control includes adjusting the processing conditions, settings, and/or recipes of one processing tool applicable to the relevant wafers according to the metrology results. In another embodiment, the metrology results are measured from a subset of processed wafers according to an optimal sampling rate determined based on the process quality and/or product quality. In yet another embodiment, the metrology results are measured from chosen fields and points of the subset of processed wafers according to an optimal sampling field/point determined based on various characteristics of the process quality and/or product quality.

One of the capabilities provided by the IC fabrication system 500 may enable collaboration and information access in such areas as design, engineering, and processing, metrology, and advanced processing control. Another capability provided by the IC fabrication system 500 may integrate systems between facilities, such as between the metrology tool and the processing tool. Such integration enables facilities to coordinate their activities. For example, integrating the metrology tool and the processing tool may enable manufacturing information to be incorporated more efficiently into the fabrication process or the APC module, and may enable wafer data from the online or in site measurement with the metrology tool integrated in the associated processing tool.

The embodiments of the present disclosure offer advantages over prior methods, it being understood that other embodiments may offer different advantages, and that no particular advantage is required for all embodiments. One advantage of the embodiments of the present disclosure is that the fabrication time can be reduced. As discussed above, human engineers need to perform manual calculations previously, whereas now everything can be automated by computers. Also, the present disclosure offers more accurate results because the results are systematically and empirically determined, and therefore are not dependent on the experience and skills of the engineer in previous methods. As such, reduction can be achieved for cycle time and workload, and a turn ratio can be increased.

One of the broader forms of an embodiment of the present disclosure involves a method. The method includes: gathering advanced process control (APC) data from a subset of available wafers and a subset of available processing chambers; establishing a matrix that contains a plurality of cells, the cells each corresponding to one of the available wafers and one of the available processing chambers, wherein the establishing the matrix includes partially filling the matrix by populating cells for which the APC data has been gathered; determining a plurality of chamber-coverage-rate (CCR) parameters associated with the matrix; optimizing the CCR parameters through an iteration process to obtain optimized CCR parameters; and predicting an APC data value for a designated cell of the matrix based on the optimized CCR parameters, the designated cell being an empty cell before the predicting and being populated by the predicting.

Another one of the broader forms of an embodiment of the present disclosure involves a method. The method includes The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   gathering advanced process control (APC) data from a subset of available wafers and a subset of available processing chambers;
   establishing a matrix that contains a plurality of cells, the cells each corresponding to one of the available wafers and one of the available processing chambers, wherein the establishing the matrix includes partially filling the matrix by populating cells for which the APC data has been gathered;
   determining a plurality of chamber-coverage-rate (CCR) parameters associated with the matrix;
   optimizing the CCR parameters through an iteration process to obtain optimized CCR parameters; and
   predicting an APC data value for a designated cell of the matrix based on the optimized CCR parameters, the designated cell being an empty cell before the predicting and being populated by the predicting.

2. The method of claim 1, further including performing a semiconductor fabrication process for the wafer in the processing chamber that correspond to the designated cell.

3. The method of claim 1, further including predicting APC data values for all empty cells of the matrix based on the optimized CCR parameters.

4. The method of claim 1, wherein the optimizing the CCR parameters includes resizing the matrix.

5. The method of claim 1, further including establishing a guessing model for the designated cell, wherein the predicting the APC data value is carried out using the guessing model.

6. The method of claim 5, wherein the optimizing the CCR parameters includes:
   comparing a guessed APC value returned by the guessing model with a measured APC value, thereby obtaining an error;
   deciding whether the error meets predetermined APC specification limits; and
   adjusting the CCR parameters in response to the deciding.

7. The method of claim 6, further including adjusting the guessing model in response to the deciding.

8. The method of claim 1, wherein the CCR parameters include:
   a first CCR parameter pertaining to which cells of the matrix can be used as valid reference cells to carry out the predicting;
   a second CCR parameter pertaining to whether a product associated with the designated cell has gone through processing at a sufficient number of processing chambers so as to make the predicting valid; and
   a third CCR parameter pertaining to a confidence index of the predicting.

9. The method of claim 1, wherein the optimizing is carried out using one of: a top-to-down approach and a bottom-up approach.

10. The method of claim 1, wherein all the cells of the matrix are associated with the same semiconductor fabrication process.

11. A method, comprising:
    collecting advanced process control (APC) data for each of a plurality of product-chamber combinations, each product-chamber combination indicating a particular product being processed at a particular semiconductor processing chamber;
    establishing a prediction model for an additional product-chamber combination, the prediction model being operable to predict APC data for the additional product-chamber combination;
    extracting a plurality of chamber-coverage-rate (CCR) ground rules based at least in part on the collecting;
    determining whether the CCR ground rules would allow the APC data predicted by the prediction model to satisfy a predefined criteria;
    modifying at least one of the CCR ground rules in response to the determining;
    repeating the determining and the modifying until the modified CCR ground rules would allow the APC data predicted by the prediction model to satisfy the predefined criteria, thereby obtaining optimized CCR ground rules; and
    predicting APC data for a plurality of further product-chamber combinations using the optimized CCR ground rules.

12. The method of claim 11, further including performing a semiconductor fabrication process for each of the plurality of additional product-chamber combinations using their respective predicted APC data.

13. The method of claim 11, wherein the CCR ground rules include: CCR_by_part_min, CCR_self_min, and CCR_avg_min.

14. The method of claim 11, wherein the modifying is carried out using one of: a top-to-down approach and a bottom-up approach.

15. The method of claim 11, wherein the predefined criteria include predefined APC specification control limits.

16. An apparatus comprising: a non-transitory, tangible computer readable storage medium storing a computer program, wherein the computer program has instructions that when executed, carry out:
gathering advanced process control (APC) data from a subset of available wafers and a subset of available processing chambers;
establishing a matrix that contains a plurality of cells, the cells each corresponding to one of the available wafers and one of the available processing chambers, wherein the establishing the matrix includes partially filling the matrix by populating cells for which the APC data has been gathered;
determining a plurality of chamber-coverage-rate (CCR) parameters associated with the matrix;
optimizing the CCR parameters through an iteration process to obtain optimized CCR parameters; and
predicting an APC data value for a designated cell of the matrix based on the optimized CCR parameters, the designated cell being an empty cell before the predicting and being populated by the predicting.

17. The apparatus of claim 16, wherein the computer program has a set of additional instructions that when executed, carry out predicting APC data values for all empty cells of the matrix based on the optimized CCR parameters.

18. The apparatus of claim 16, wherein the computer program has a set of additional instructions that when executed, carry out establishing a guessing model for the designated cell, wherein the predicting the APC data value is performed using the guessing model.

19. The apparatus of claim 16, wherein the instructions that carry out the optimizing the CCR parameters include instructions that carry out resizing the matrix.

20. The apparatus of claim 16, wherein the instructions that carry out the determining the plurality of CCR parameters include instructions for determining a CCR_by_part_min parameter, a CCR_self_min parameter, and a CCR_avg_min parameter.

* * * * *